(No Model.)
V. A. BILLETTE.
PACKING BOX OR CARTRIDGE FOR VARIOUS ARTICLES.
No. 300,748. Patented June 17, 1884.
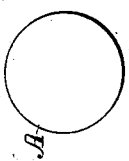
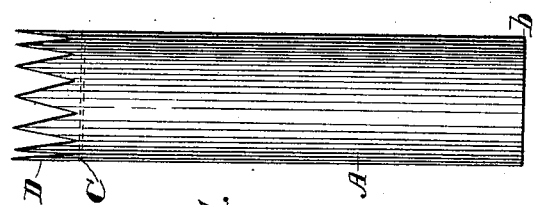
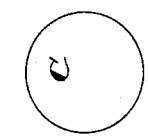
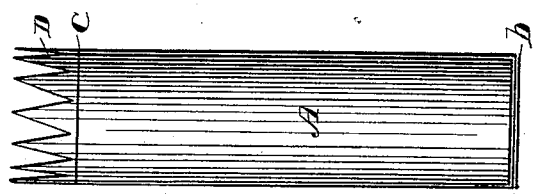
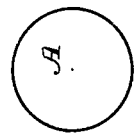
Witnesses
Inventor
Victor A. Billette
by A. Volk,
his attorney.

UNITED STATES PATENT OFFICE.

VICTOR ACHILLE BILLETTE, OF RENNES, FRANCE.

PACKING BOX OR CARTRIDGE FOR VARIOUS ARTICLES.

SPECIFICATION forming part of Letters Patent No. 300,748, dated June 17, 1884.

Application filed March 29, 1884. (No model.) Patented in France May 7, 1883, No. 155,258.

*To all whom it may concern:*

Be it known that I, VICTOR ACHILLE BILLETTE, a citizen of France, residing at Rennes, in the Department of the Ille-et-Vilaine, have invented new and useful Improvements in Packing Boxes or Cartridges for Various Articles, of which the following is a specification.

This invention has reference to packages for containing parched or roasted coffee or other alimentary or aromatic substance in a form convenient for transportation and use by persons on a march or journey, which packages are furthermore adapted to preserve the aroma of said coffee or other substance and prevent loss of strength or flavor or other deterioration.

It consists of an elongated cylinder or tube adapted to contain a ration of coffee or other material, and made from parchment-paper, such cylinder or tube being closed at one end in any ordinary or suitable way, and at the opposite end by folding the body, which is there indented, upon a disk inserted into said cylinder or tube below the base of the triangular teeth, between the indentations. The cylinder or tube is filled to the proper point before the disk is inserted, so that when inserted it will rest upon said material. From their shape, size, and general appearance the packages are called "cartridges."

These parchment cartridges may contain roasted coffee, either ground or in the berry, or coffee with a quantity of sugar superimposed or mixed therewith; but they may also serve for the preservation and transportation of tea, solid beef extracts, and all aromatic substances or matters of which it is desirable to preserve the aroma without loss of strength for any length of time before use.

It will not be necessary to point out the particular advantages which result from this system of preservation of alimentary or aromatic substances or the inconveniences attending all the preparations of the same heretofore devised, whether in the form of tablets, cakes, or powder, and put upon the market in metal cases or boxes.

The accompanying drawings show, by way of illustration, an alimentary cartridge made in accordance with my invention.

Figure 1 is an elevation of a tube, A, made of parchment-paper, the said tube being closed at its lower end, $b$, in any ordinary or suitable way—as, for example, by folding in the end of the cylinder or tube. The blank from which the tube is formed may be a rectangular piece indented at one side. It is placed around a former, the overlapping edges cemented, and the end not indented folded in.

Fig. 2 is a plan of a disk, C, having the diameter of the interior of the tube A, which is shown in vertical section in Fig. 3 and in horizontal section in Fig. 4. This disk C is intended to be inserted in the mouth of the tube after the same is filled up to the point indicated in dotted lines, Fig. 2, when the cartridge is closed by folding over the indented part D against the disk C.

Figs. 5 and 6 represent in elevation and plan, respectively, a full-sized cartridge closed at both extremities.

A cartridge of the size shown in the drawings will contain the daily regulation ration of coffee and sugar of a French soldier.

If deemed desirable, the cartridge may be additionally protected by covering it with a coating of water-proof material, and the mouth or aperture may be hermetically closed, as by sealing. A soldier, sailor, or traveler may thus be provided with a daily supply of coffee and sugar, and be enabled to prepare sufficient beverage for daily consumption by macerating the coffee in water and heating to the boiling-point.

I claim—

A cartridge for containing a ration of coffee or other alimentary or aromatic substance, said cartridge comprising a tubular or cylindrical case of parchment-paper indented at one end, and closed at that end by a disk inserted below the indentations in the cylinder or tube, the triangular pieces or teeth between the indentations being folded down upon said disk, substantially as described.

In testimony whereof I have signed this specification in the presence of two subscribing witnesses.

VICTOR ACHILLE BILLETTE.

Witnesses:
 EMIL BARRAULT,
 AUG. VINCK.